UNITED STATES PATENT OFFICE 2,583,963

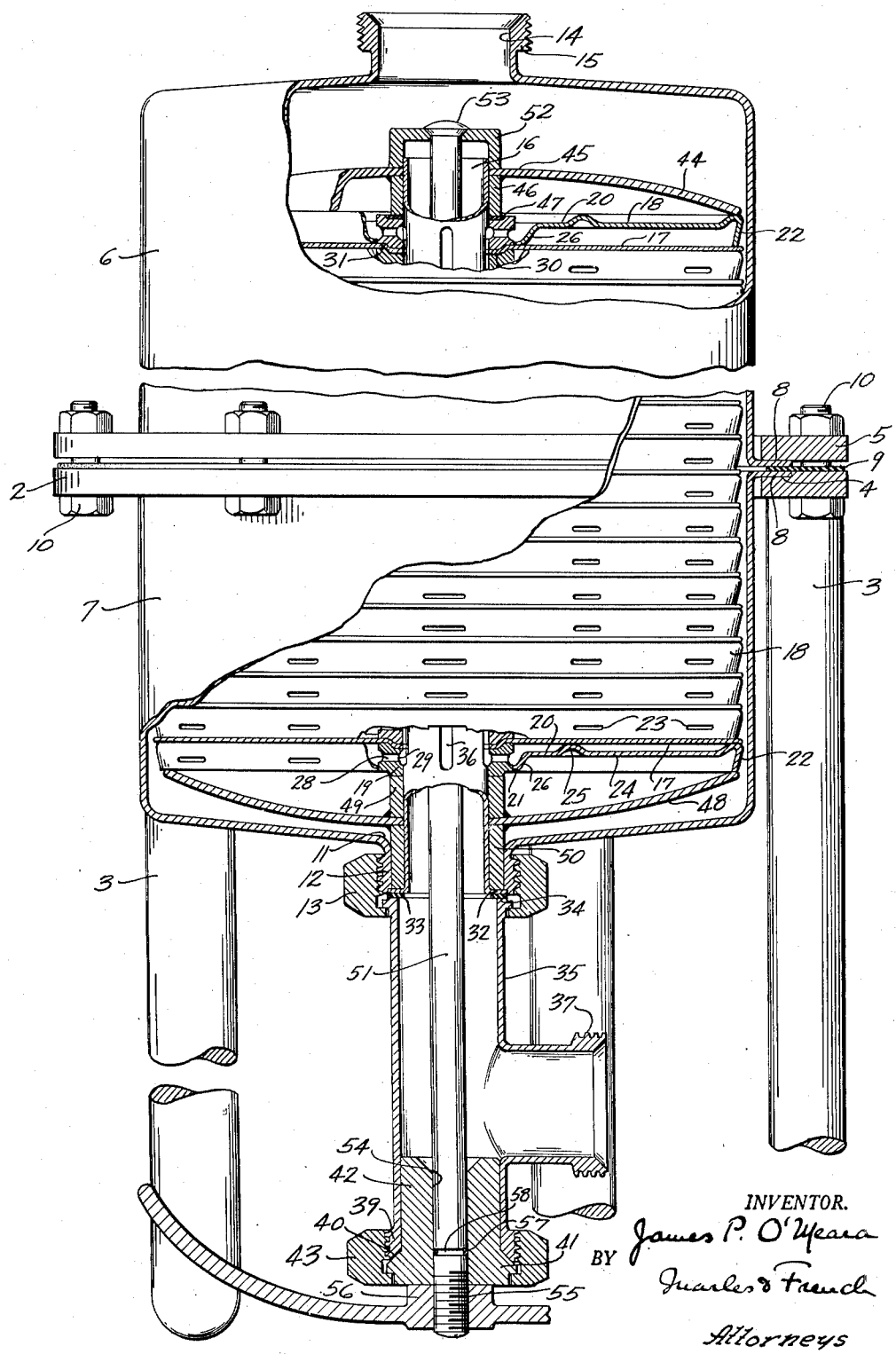

FILTER

James P. O'Meara, Milwaukee, Wis., assignor to W. M. Sprinkman Corporation, Milwaukee, Wis., a corporation of Wisconsin Application December 10, 1948, Serial No. 64,625

3 Claims. (Cl. 210—169)

The invention relates to filters.

Filters for milk and similar liquids as now constructed comprise a standpipe, a plurality of filter supporting plates and filter pads clamped between the plates in which the plates themselves are relied upon to clamp the pad between them at the peripheral portions thereof. Owing to the fact that the plates are stampings, they cannot be too thick, and the result is that the plates are too thin to provide the desired clamping action at their outer peripheries and they yield to clamping pressure. One object of this invention is to provide a pair of resilient convex clamping plates of heavier section than the filter supporting plates between which the filter supporting plates and the pads are clamped, said plates being of thinner cross section at their hub or center portions than at their periphery, so that the clamping action starts at the periphery, and as clamping continues the spring action of the clamping plates produces an efficient clamping action at the center portions of the filter supporting plates so that a tight seal between the supporting plates and the pads is obtained both at the center and the outer peripheries thereof, it being noted that such action is not possible with non-resilient clamping plates because with such plates the clamping action between the centers and outer peripheries of the filter elements is the same and no differential clamping action between the centers and peripheries of the filter elements is possible.

A further object of the invention is to provide a filter in which all internal threads have been eliminated so that the parts of the device that come in contact with the liquid, such as milk, to be filtered are easier to clean, and thus a more sanitary apparatus is provided.

The invention further consists in the several features hereinafter set forth and more particularly defined by claims at the conclusion hereof.

The drawing shows an elevation view of a filter embodying the invention, parts being broken away and parts being shown in section.

The apparatus in general includes a support, a clamping ring, a multi-part housing or casing clamped to said support by said ring, and a filter unit mounted in and carried by said housing.

The support, clamping ring, and housing are similar to that of my prior U. S. Patent No. 2,452,486, dated October 26, 1948. The support includes a top ring 2 to which the upper ends of supporting legs 3 are welded, said ring having an annular recess 4. The clamping ring 5 is an annular ring.

The housing or casing includes upper and lower cup-shaped sections 6 and 7, each having an outwardly extending base flange 8. The flange 8 of the lower section is adapted to seat in the recess 4 with a gasket 9 disposed between said sections which are clamped in this position between the rings 2 and 5 by clamping bolts 10.

The lower casing section has a central opening 11 in its bottom to which a threaded section 12 is welded to provide a threaded end upon which an inwardly flanged clamping nut 13 is mounted.

The upper casing section has a central opening 14 in its top to which a threaded section 15 is welded to provide a mounting for a union coupling connecting said casing to an outlet pipe (not shown).

The filter unit includes a standpipe 16, filter pads 17, supporting disks 18, and means for clamping these parts in assembled relation. The filter pads are annular thin rings of filtering material of known construction. The supporting disks are substantially the same as those shown in my prior Patent No. 2,452,486, or may be of any other suitable construction having a hub portion and a flanged peripheral portion. As shown, these disks are formed of two sections, a heavy hub section 19 and an annular sheet metal section 20, both preferably formed of stainless steel with the inner edge 21 butt welded to the hub 19. The sections 20 are annular sheet metal stampings formed to provide a peripheral or exterior flanged portion 22 provided with spaced openings 23, a medial depressed portion 24 provided with a series of radially disposed upstanding protuberances 25, and an inner inclined portion 26 whose inner edge 21 is welded to said hub 19. Between the inner edge of section 20 and the outer flange 22, the medial portion 24 lies in a medial plane so as to provide channels between the bumps or protuberances 25. The hub sections 20 have radially disposed openings 28 connecting the exterior of the ring with the grooved interior 29. The top of each ring has an annular recess 30 formed therein, and the bottom of each ring has an annular boss 31 complementary to said top recess, so that said rings will nest together and center themselves relative to each other, said tops and bottoms being of relatively large area and receiving the inner portions of the pads 17 between them and firmly crimping them between them. The flange 22 is so dimensioned relative to the hub 19 that when the pads 17 are disposed between adjacent disks, and a clamping pressure is exerted both at the hubs and peripheral or flanged portions of the disks, the pads will be firmly clamped at their centers and peripheral portions between the disks. While not shown herein, the spiders 30 of my prior patent may be interposed between the disks and rest on the pads.

The standpipe 16 is a plain metal tube preferably of stainless steel and devoid of threads and is provided with a flanged lower end 32 which is clamped together with a compressible washer 33 and the flanged end 34 of a T-pipe fitting 35 against the recessed edge of the section 12 of the lower casing by the nut 13. The standpipe 16 is provided with one or more vertically extending outlet slots 36 in the region where the supporting disks 18 are positioned.

The T-fitting 35 has an exteriorly threaded inlet 37 and an exteriorly threaded lower end 39 having an inclined valve seat surface 40 in engagement with which the conically headed end 41 of a plug 42 is clamped by a nut 43.

The means for clamping the filter pads and supporting disks in operative assembled relation on the standpipe includes an upper clamping member, a lower clamping member and means for exerting pressure between said members. The upper clamping member or plate is formed as a convex resilient disk 44 of sheet metal whose central portion 45 is of less thickness than its peripheral portion which is adapted to engage the flanged peripheral portions of the upper supporting disk 18 and is welded to a tubular collar or hub 46 adapted to engage a gasket 47 mounted in the upper recess 30 of the hub of said disk. The lower clamping member or plate is formed as a convex resilient metal disk 48 of sheet metal whose central portion is of less thickness than its peripheral portion which engages the flanged peripheral portion of the lower supporting disk 18 and is welded to a tubular hub 49 adapted to abut the lower edge of the hub 19. Either welded to said lower clamping member or separate therefrom is a spacing collar 50 whose lower edge abuts the flanged end 34 of the standpipe.

For exerting clamping pressure between the clamping plates above described, a clamping bolt 51 provided with a separable cap 52 having a bevelled fluid-tight seal therewith at 53 extends down through the assembled unit, through a central opening 54 in the plug 42 and is threaded at its lower end 55 to receive the threaded hub of a hand operated clamping nut 56, said bolt preferably having an O-ring 57 mounted in an annular groove 58 above its threaded portion to seal this end of the bolt against escape of fluid through said plug.

With the above construction with the standpipe 16 clamped to the T-fitting 35 and the lower end of the lower casing section 7 by the nut 13, the clamping plates, the supporting disks and the filter pads are assembled on the standpipe as shown in the drawing, the cap 52 is placed over the top of the standpipe in abutting relation with the upper disk 44 and the bolt 51 then passed down through the cap 52, standpipe 16 fitting 35 and its plug 42, the hand nut 56 is then fitted onto the lower threaded end of the bolt and tightened against the plug 42, thus drawing the assembled parts together and in tight assembled relation with each other. During this clamping process, clamping between the disks 18 and the pads 17 starts between the outer peripheral portions of the disks 18 and the pads 17 and the disks 44 and 48 of the clamping members, and then, due to the resiliency of the said disks 44 and 48, as clamping pressure is continued the hub portions 20 of the disks 18 and the pads 17 are drawn tightly together so that both of the central and peripheral portions of these filter parts are clamped together.

As in the prior patent the plates or disks 18 when clamping pressure is applied to their peripheral portions have a bellows action tending to force the flanges 22 outwardly around the entire circumference and bring the filter media or pad into tension since this pad is tightly clamped at its central portion between the interlocking hubs. This bellows action has been found to be sufficient in the prior patented construction to sometimes cause the peripheral flange of one disk to nest over the top edge of the adjacent disk and in the present construction it will be noted that the flanges 22 incline inwardly toward their lower edge to allow for the tendency of the flanges to spread or bellow out when clamped and prevent a nesting effect of the disks on such outward movement. Owing to the fact that the flanged portions 22 of the disks are capable of outward movement because of the yielding of said disks, the resiliency of the plates 44 compensates for the bellows action of the peripheral portions of the disks without causing a permanent deformation and securely holds the peripheral portions of the disks 18 in contact with the tensioned filter pads 17.

Also it will be noted that there are no internal threads on any of the interior surfaces that may come in contact with the milk or other liquid to be filtered so that said surfaces may be readily cleaned. The filtering action of the above described apparatus is similar to that of my heretofore mentioned prior U. S. patent.

I desire it to be understood that this invention is not to be limited to any particular form or arrangement of parts except in so far as such limitations are included in the claims.

What I claim as my invention is:

1. In a filter, the combination of an apertured standpipe, a filter unit comprising a series of filter pad supporting metal disks, each disk having a hub portion provided with passages connected with the apertured portion of the standpipe, an annular yieldable body portion and an apertured flanged peripheral portion having an edge adapted to move laterally outward on the application of pressure upon said body portion where it joins said flanged portion, annular filter pads mounted between said disks and engaged by the hub and peripheral portions thereof, and means for clamping said disks and pads together comprising clamping members at opposite ends of said filter unit, each clamping member including a concavo-convex resilient plate whose peripheral portion at its concave side engages the peripheral portion of an abutting disk adjacent said flange and a non-resilient hub engaging the hub portion of said disk, said plates being of varying cross-section with a portion of reduced thickness adjacent their hubs, and means distinct from said standpipe for exerting a clamping pressure on the hubs of said clamping members to exert pressure first on the peripheral portions of said disk to cause a lateral displacement of the edges of the flanged peripheral portions of said disks tending to tension said pads under a yielding pressure between adjoining disks and thereafter exert a clamping pressure between the hubs of said plates, the hubs of said disks and inner edges of said pads.

2. In a filter, the combination of an apertured standpipe, a filter unit comprising a series of filter pad supporting metal disks, each disk having a hub portion provided with passages connected with the apertured portion of the standpipe, an annular yieldable body portion and an apertured flanged peripheral portion having an edge adapted to move laterally outward on the application of pressure upon said body portion where it joins said flanged portion, annular filter pads mounted between said disks and engaged by the hub and peripheral portions thereof, and means for clamping said disks and pads together comprising clamping members at opposite ends of said filter unit, each clamping member including a concavo-convex resilient plate, whose peripheral portion at its concave side engages the peripheral portion of an abutting disk adjacent said flange, and a non-resilient hub engaging the hub portion of said disk, said plates being of varying cross-section with a portion of reduced thickness adjacent their hubs, and means for exerting a clamping pressure on the hubs of said clamping members to exert pressure first on the peripheral portions of said disks to cause a lateral displacement of the edges of the flanged peripheral portions of said disks tending to tension said pads under a yielding pressure between adjoining disks and thereafter exert a clamping pressure between the hubs of said plates, the hubs of said disks and the inner edges of said pads.

3. A filter in accordance with claim 2 in which the apertured peripheral flanges of said disks are inclined inwardly from their point of junction with the body portion of the disk to prevent nesting of said disks on the circumferential displacement of the edges of said disks under clamping pressure.

JAMES P. O'MEARA.

REFERENCES CITED

The following references are of record in the file of this patent:

UNITED STATES PATENTS

| Number | Name | Date |
|---|---|---|
| 188,274 | Woolsey | Mar. 13, 1877 |
| 915,650 | Anderson | Mar. 16, 1909 |
| 1,172,728 | Perkins | Feb. 22, 1916 |
| 2,137,556 | Young | Nov. 22, 1938 |
| 2,278,453 | Kracklauer | Apr. 7, 1942 |
| 2,345,014 | Stamsvik | Mar. 28, 1944 |
| 2,452,486 | O'Meara | Oct. 26, 1948 |

FOREIGN PATENTS

| Number | Country | Date |
|---|---|---|
| 6,629 | Great Britain | Apr. 9, 1900 |